(12) United States Patent
Tan-Kim et al.

(10) Patent No.: US 11,041,400 B2
(45) Date of Patent: Jun. 22, 2021

(54) TURBOMACHINE COMPRISING AN ALTERNATOR BETWEEN TWO COUNTER-ROTATING ELEMENTS

(71) Applicant: SAFRAN AIRCRAFT ENGINES, Paris (FR)

(72) Inventors: Alexandre Jean-Marie Tan-Kim, Moissy-Cramayel (FR); Julien Fabien Patrick Becoulet, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 0 days.

(21) Appl. No.: 16/709,990

(22) Filed: Dec. 11, 2019

(65) Prior Publication Data

US 2020/0191010 A1    Jun. 18, 2020

(30) Foreign Application Priority Data

Dec. 12, 2018 (FR) ...................... 18 72793

(51) Int. Cl.
*F01D 15/10* (2006.01)
*F01D 1/24* (2006.01)
*F01D 5/02* (2006.01)
*F16H 57/02* (2012.01)

(52) U.S. Cl.
CPC ............ *F01D 15/10* (2013.01); *F01D 1/24* (2013.01); *F01D 5/026* (2013.01); *F16H 57/02* (2013.01); *F16H 2057/02073* (2013.01)

(58) Field of Classification Search
CPC . F01D 15/10; F01D 1/24; F01D 5/026; F16H 57/02
See application file for complete search history.

(56) References Cited

U.S. PATENT DOCUMENTS

2010/0326050 A1* 12/2010 Schilling ................. F01D 15/10
60/268
2018/0023483 A1    1/2018 Le Pache et al.

FOREIGN PATENT DOCUMENTS

| EP | 2 270 315 A2 | 1/2011 |
| EP | 2 947 278 A1 | 11/2015 |
| EP | 3 246 546 A1 | 11/2017 |

OTHER PUBLICATIONS

French Preliminary Search Report dated Sep. 2, 2019 in French Application 18 72793 filed Dec. 12, 2018 (with English Translation of Categories of Cited Documents), 2 pages.

\* cited by examiner

*Primary Examiner* — Viet P Nguyen
(74) *Attorney, Agent, or Firm* — Oblon, McClelland, Maier & Neustadt, L.L.P.

(57) ABSTRACT

A geared turbomachine includes: a fan, a low pressure shaft which drives the fan rotationally around the main axis of the turbomachine, a speed reducer interposed between the fan and the low pressure shaft, and an alternator driven by the low pressure shaft. The alternator includes an inductor and an armature of which one of the inductor and the armature is integral with the fan and the other of the inductor and the armature is integral with the low pressure shaft.

10 Claims, 2 Drawing Sheets

TURBOMACHINE COMPRISING AN ALTERNATOR BETWEEN TWO COUNTER-ROTATING ELEMENTS

TECHNICAL FIELD

The invention relates to a dual flow turbomachine comprising an alternator combined with a reducer arranged between the fan and the low pressure shaft.

PRIOR ART

In certain dual flow turbomachines, a reducer is interposed between the fan and the low pressure shaft so that the two components can rotate at different rotational speeds, notably so that the fan rotates at a speed less than that of the low pressure shaft.

The lower speed of the fan makes it possible to increase the span of the fan, which then makes it possible to attain higher dilution rates, leading to lower fuel consumption and to a considerable noise reduction.

When the turbomachine operates in freezing conditions, ice can be created on the inlet cone (commonly called spinner) of the turbomachine. When it becomes detached under centrifugal force, this ice generates imbalance and may damage the turbomachine on account of vibrations and impacts of pieces of ice in the flow path.

In a dual flow turbomachine with reducer the fan has a reduced rotational speed with respect to the low pressure shaft. The risk of creation of ice is thus increased since water deposited on the fan is less easily evacuated by centrifugation.

At present, the common procedure for ejecting the ice formed on a fan is to perform, after instruction of a fan icing alarm, engine speed variations from the cockpit.

Another solution consists in installing an electrical de-icing system which requires, for its part, an electrical supply.

Also, the electricity source supplying notably the de-icing system could supply a mechanism for modifying the pitch of the vanes of the fan.

The aim of the invention is to propose a turbomachine comprising an electricity source associated with the fan.

DESCRIPTION OF THE INVENTION

The invention proposes a geared turbomachine comprising:
- a fan delivering air to a primary flow path and to a secondary flow path which are coaxial with each other and to a main axis A of the turbomachine,
- a low pressure shaft connecting a low pressure turbine in the primary flow path to a low pressure compressor in the primary flow path, which rotationally drives the fan around the main axis A of the turbomachine,
- a speed reducer interposed between the fan and the low pressure shaft, which is of the epicyclic gear train type comprising three components among a ring, a satellite carrier and a sun pinion, of which a first component is integral with the low pressure shaft, a second component is integral with the fan and the third component is fixed in the turbomachine, and
- an alternator driven notably by the low pressure shaft, characterised in that the alternator comprises an inductor and an armature of which one of the inductor and the armature is integral with the fan and the other of the inductor and the armature is integral with the low pressure shaft.

Preferably, the inductor is integral with the low pressure shaft and the armature is integral with the fan.

Preferably, the speed reducer is designed so that the direction of rotation of the fan is opposite to the direction of rotation of the low pressure shaft.

Preferably, the sun pinion is integral with the low pressure shaft, the ring is integral with the fan and the satellite carrier is fixed in the turbomachine.

Preferably, the fan comprises a fan disc bearing a plurality of vanes, which is guided rotationally with respect to a stator of the turbomachine by a guide bearing which is situated at the level of an axial downstream end of the fan disc, and the alternator is situated axially along the main axis A of the turbomachine near to the guide bearing.

Preferably, the turbomachine comprises an inter-shaft bearing interposed between an axial upstream end of the low pressure shaft and the fan disc, said inter-shaft bearing being situated axially upstream of the guide bearing and upstream of the alternator.

Preferably, the turbomachine comprises an inter-shaft bearing interposed between an axial upstream end of the low pressure shaft and the fan disc and the alternator is situated axially upstream of the guide bearing and the inter-shaft bearing.

Preferably, the fan comprises a fan disc bearing a plurality of vanes and an inlet cone extending towards the upstream of the fan disc, and the alternator is situated axially inside a volume delimited by the inlet cone.

Preferably, the turbomachine comprises means for electrically connecting the alternator with at least one fixed component of the turbomachine.

Preferably, the turbomachine comprises means for electrically connecting the alternator with at least one moveable component of the turbomachine.

BRIEF DESCRIPTION OF THE DRAWINGS

Other characteristics and advantages of the invention will become clear on reading the detailed description that follows, for the understanding of which reference will be made to the appended figures among which.

DETAILED DESCRIPTION OF PARTICULAR EMBODIMENTS

Figure 1:
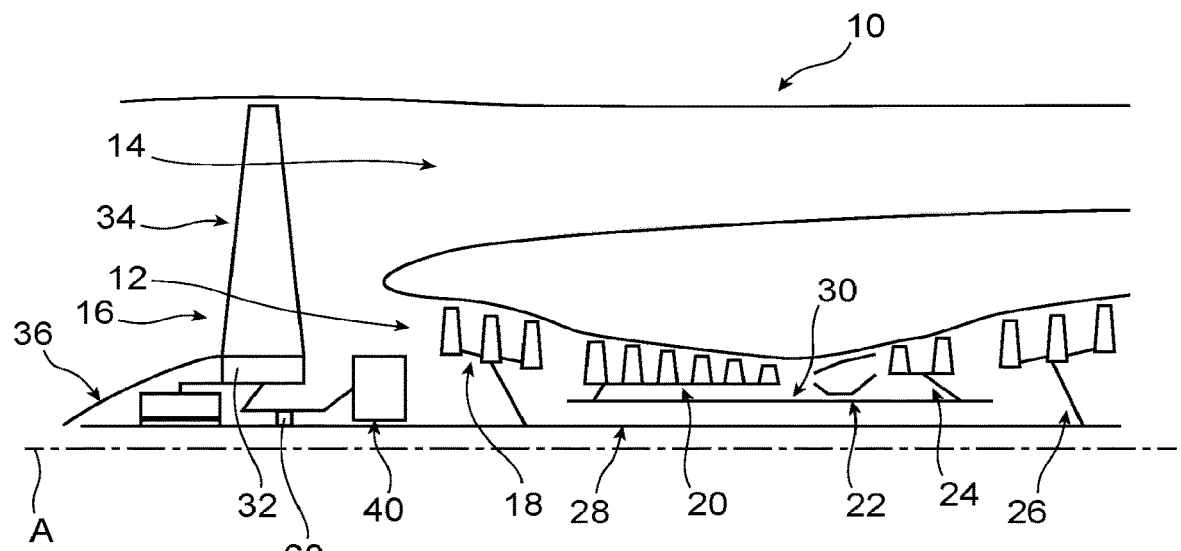
FIG. 1 is a schematic representation in axial section of an aircraft turbomachine comprising a reducer and an alternator mounted between the fan and the low pressure shaft.

FIG. 1 represents an aircraft turbomachine 10 of the dual flow type of main axis A.

The turbomachine 10 comprises a primary flow path 12 and a secondary flow path 14 coaxial with each other and coaxial to the main axis A. The primary flow path 12 is situated radially inside the secondary flow path 14.

The turbomachine 10 also comprises a fan 16 which is coaxial with the main axis A and which is installed at the axial upstream end of the turbomachine.

Through its rotation, the fan 16 delivers air to the primary flow path 12 and to the secondary flow path 14.

The primary flow path 12 comprises successively along the axial direction, a low pressure compressor 18, a high pressure compressor 20, a combustion chamber 22, a high pressure turbine 24 and a low pressure turbine 26.

The low pressure compressor 18 and the low pressure turbine 26 are coupled to each other by a low pressure shaft 28. The high pressure compressor 20 and the high pressure turbine 24 are coupled to each other by a high pressure shaft 30.

The fan 16 mainly comprises a fan disc 32, a plurality of vanes 34 which are borne by the fan disc 32 while extending radially with respect to the main axis A of the turbomachine 10 and an inlet cone 36 which extends axially towards the upstream of the fan disc 32, which confers on the radially central part of the fan 16 an aerodynamic configuration.

The fan 16 is rotationally driven around the main axis A of the turbomachine 10 through the low pressure shaft 28.

The rotational speed of the fan 16 is less than the rotational speed of the low pressure shaft 28, notably to make it possible to increase the span of the fan 16 and thus the dilution rate. This enables both an operation of the low pressure turbine 26 and the low pressure compressor 18 at their optimal speeds.

A speed reducer 40 is interposed between the fan 16 and the low pressure shaft 28. This speed reducer 40 makes it possible to modify the ratio between the rotational speed of the fan 16 and the rotational speed of the low pressure shaft 28 and thereby to reduce the rotational speed of the fan 16 with respect to the rotational speed of the low pressure shaft 28.

Figure 2:
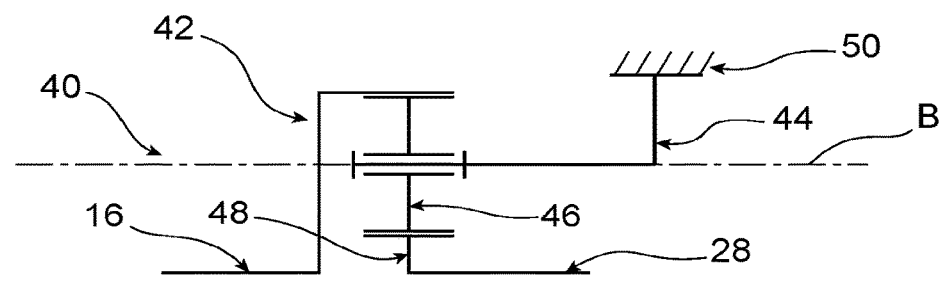
FIG. 2 is a detail at larger scale of a preferred embodiment of the reducer.

As may be seen in greater detail in FIG. 2, and according to a preferred embodiment, the speed reducer 40 is a reducer of the epicyclic gear train type, it comprises a ring 42, a satellite carrier 44, a plurality of satellites 46 and a sun pinion 48. Each satellite 46 is guided rotationally around a secondary axis B which is parallel to the main axis A and which is integral with the satellite carrier 44. Each satellite 46 is further coupled with an inner teething of the ring 42 and with an outer teething of the sun pinion 48.

Each of the three components which are the ring 42, the satellite carrier 44 and the sun pinion 48 is integral with the low pressure shaft 28, the fan 16 or a fixed element of the turbomachine, which will be designated hereafter a stator 50.

Here the reducer is with planetary configuration, that is to say that the ring 42 is integral with the fan 16, the satellite carrier 44 is integral with the stator 50 and the sun pinion 48 is integral with the low pressure shaft 28.

This configuration of the reducer 40 makes it possible on the one hand to reduce the rotational speed of the fan 16 with respect to the rotational speed of the low pressure shaft and it makes it possible on the other hand to reverse the direction of rotation of the fan 16 with respect to the direction of rotation of the low pressure shaft 28.

It will be understood that the invention is not limited to this configuration of the reducer and that its elements 42, 44, 48 may be made integral with the fan 16, the stator 50 or the low pressure shaft 28 according to another configuration.

The reversal of the direction of rotation of the fan and the low pressure shaft, combined with the reduction ratio of the reducer 40 thereby makes it possible to have a relative rotational speed of the fan 16 with respect to the low pressure shaft 28.

According to a preferred embodiment, the reduction ratio (R) is comprised between 2 and 5, which makes it possible to have a difference in rotational speeds greater than 10,000 rpm.

This difference in rotational speeds between the fan 16 and the low pressure shaft 28 is exploited by an alternator 52 which comprises an inductor 54 and an armature 56 made integral with the low pressure shaft 28 or with the fan 16.

Figure 3:
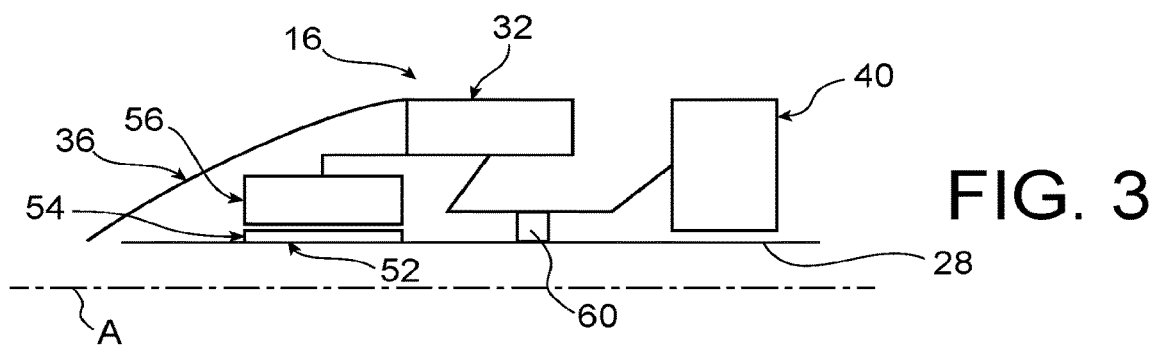
FIG. 3 is a detail at larger scale of the upstream end of the turbomachine represented in FIG. 1, showing the armature and the inductor of the alternator.

Here, and as has been represented as a preferred example in FIG. 3, the low pressure shaft 28, which is driven by the low pressure turbine 26, is coupled to the fan disc 32 through the reducer 40. As has been described previously, the reducer 40 has the aim of reducing and reversing the rotational speed of the fan disc 32 with respect to the low pressure shaft 28.

The inductor 54 of the alternator 52 is made integral with the low pressure shaft 28 and the armature 56 is made integral with the fan disc 32.

Thus, the rotational speed of the armature 56 is less than that of the inductor 54 and their directions of rotation are opposite.

According to the embodiment represented in FIGS. 1 and 3, the alternator 52 is arranged inside the volume delimited by the inlet cone 36.

Figure 4:
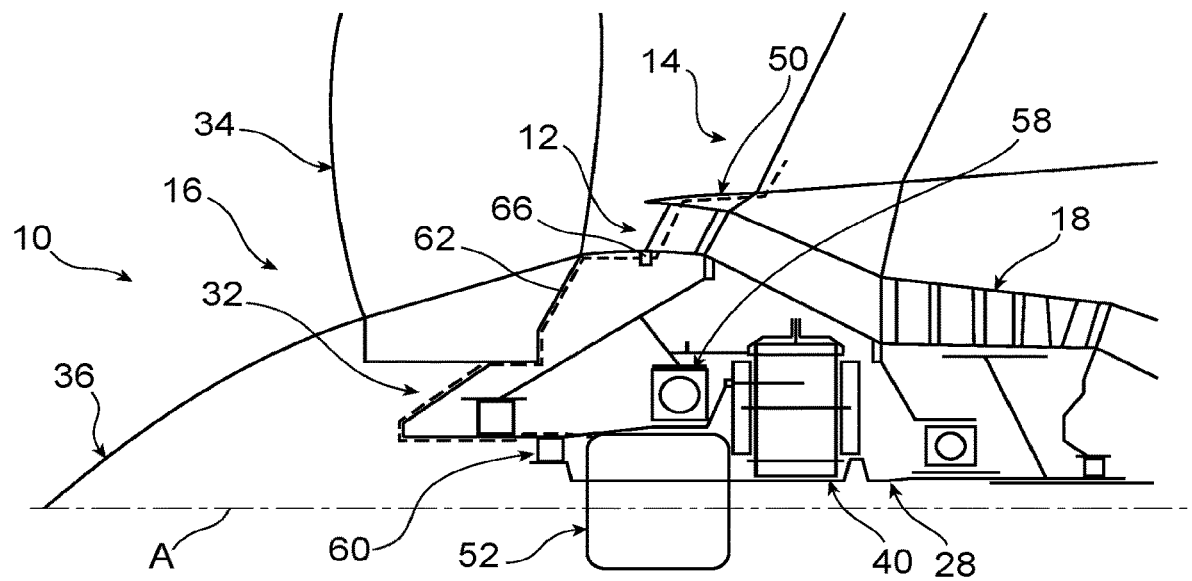
FIG. 4 is a detail at larger scale of the upstream end of the turbomachine represented in FIG. 1, showing an embodiment of the relative positioning of the alternator with respect to the guide bearings.
Figure 5:
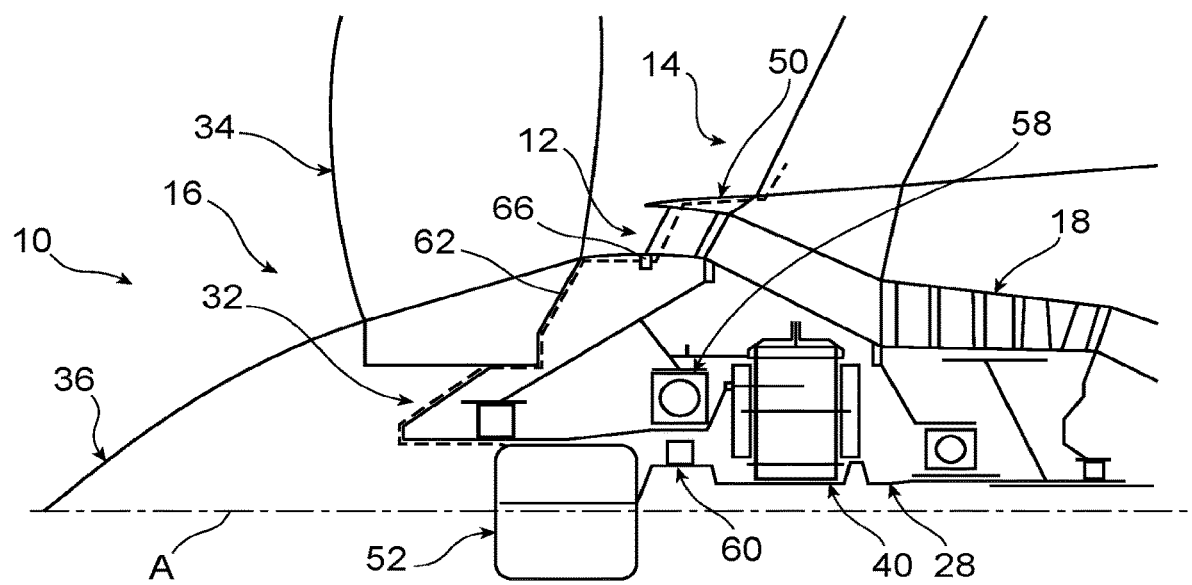
FIG. 5 is a view similar to that of FIG. 4, showing another embodiment of the relative positioning of the alternator with respect to the guide bearings

In FIGS. 4 and 5 are represented other embodiments for which the positioning of the alternator is different, which notably makes it possible to limit its displacements and also to facilitate the balancing operations.

According to these embodiments, the alternator 52 is arranged near to a bearing 58 for rotationally guiding the fan 16 with respect to the stator 50.

This bearing 58 is situated axially downstream of the fan disc 32 and it is situated at the level of an axial downstream end of the fan disc 32.

According to the embodiment represented in FIG. 4, the alternator 52 is situated substantially on the same axial side as the guide bearing 58, along the main axis A of the turbomachine 10.

The inner diameter of the guide bearing 58 is dimensioned for this purpose, to be able to house therein the alternator 52.

According to another embodiment represented in FIG. 5, the alternator 52 is situated axially upstream of the guide bearing 58, along the main axis A of the turbomachine 10.

The fan also comprises an inter-shaft bearing 60, which is interposed between the fan disc 32 and the low pressure shaft 28. This inter-shaft bearing 60 is also represented in FIGS. 1 and 3.

This inter-shaft bearing 60 makes it possible to guide the upstream end of the low pressure shaft 28 up to the alternator 52. In addition, the presence of this inter-shaft bearing 60 makes it possible to limit the displacements of the low pressure shaft 28 with respect to the reducer 40 and to the alternator 52, which contributes to improving the lifetime of these two elements.

According to the embodiment represented in FIG. 4, the alternator 52 is situated axially downstream of the inter-shaft bearing 60, along the main axis A of the turbomachine 10. Thus, the inter-shaft bearing 60 is situated axially upstream of the alternator 52 and the guide bearing 58.

According to the embodiment represented in FIG. 5, the alternator 52 is situated axially upstream of the inter-shaft bearing 60, along the main axis A of the turbomachine 10. Thus, the alternator 52 is situated axially upstream of the inter-shaft bearing 60 and the guide bearing 58.

It will be understood that the axial position of the alternator 52 along the main axis A of the turbomachine with respect to the bearings 58, 60 may be different from those which have just been described, and that it will be defined as a function of the position of these bearings in the turbomachine 10.

The alternator 52 makes it possible to supply with electricity the components which are borne by the fan 16. These components, also called electrical services, may notably be a system for de-icing the inlet cone 36 or a mechanism for modifying the pitch of the vanes 34 of the fan 16 by electric jacks.

The alternator 52 may also supply other components of the turbomachine 10, which are not borne by the fan 16, such as an auxiliary electrical pump for supplying the reducer with oil.

In this case, and as may be seen in a schematic manner in FIGS. 4 and 5, an electricity circuit 62 is incorporated in the fan and it is connected to the stator 50 of the turbomachine.

A rotating system for transferring 66 electrical energy is interposed between the fan 16 and the stator 50.

Thus, the alternator 52 can supply components of the turbomachine 10 which are fixed in the turbomachine and/or components of the turbomachine 10 which are moveable therein.

The counter-rotativity of the fan disc 32 compared to the low pressure shaft 28 by the use of a speed reducer 40 of the planetary type makes it possible to have a considerable difference in rotational speed between these two components, for example of around 12,000 rpm. This order of magnitude of the difference in rotational speeds is exploited by installing an alternator 52 near to the fan.

The counter-rotativity of the fan disc 32 compared to the low pressure shaft 28 increases the speed differential, which makes it possible to have a wide range of operating speeds which facilitates the optimisation of the alternator 52.

As a non-limiting example, the electrical power generated by the alternator is comprised between 100 and 500 kW, at a frequency comprised between 500 Hz and 2 kHz.

The alternator 52 is of permanent magnet type or of asynchronous machine type. The type of the alternator is chosen as a function of the optimisation criteria chosen such as, as non-limiting examples, the bulk, the impact on the mass of the turbomachine 10, its power, its efficiency and its ease of maintenance.

The thrust range of the turbomachine is comprised between 20,000 lbf and 80,000 lbf.

The invention claimed is:

1. A geared turbomachine comprising:
   a fan delivering air to a primary flow path and to a secondary flow path which are coaxial with each other and to a main axis of the turbomachine;
   a low pressure shaft connecting a low pressure turbine in the primary flow path to a low pressure compressor in the primary flow path, which drives the fan rotationally around the main axis of the turbomachine;
   a speed reducer interposed between the fan and the low pressure shaft, the speed reducer being an epicyclic gear train comprising three components among a ring, a satellite carrier and a sun pinion, of which a first component is integral with the low pressure shaft, a second component is integral with the fan and the third component is fixed in the turbomachine; and
   an alternator driven by the low pressure shaft,
   wherein the alternator comprises an inductor and an armature, the inductor being integral with the fan and the armature being integral with the low pressure shaft,
   wherein the speed reducer is designed so that a direction of rotation of the fan is opposite to a direction of rotation of the low pressure shaft, and
   wherein the sun pinion is integral with the low pressure shaft, the ring is integral with the fan, and the satellite carrier is fixed in the turbomachine.

2. The turbomachine according to claim 1, wherein the fan comprises a fan disc bearing a plurality of vanes, which is guided rotationally with respect to a stator of the turbomachine by a guide bearing which is situated at a level of an axial downstream end of the fan disc, and
   wherein the alternator is situated axially along the main axis of the turbomachine near to the guide bearing.

3. The turbomachine according to claim 2, further comprising an inter-shaft bearing interposed between an axial upstream end of the low pressure shaft and the fan disc, said inter-shaft bearing being situated axially upstream of the guide bearing and upstream of the alternator.

4. The turbomachine according to claim 2, further comprising an inter-shaft bearing interposed between an axial upstream end of the low pressure shaft and the fan disc,
   wherein the alternator is situated axially upstream of the guide bearing and the inter-shaft bearing.

5. The turbomachine according to claim 1, wherein the fan comprises a fan disc bearing a plurality of vanes and an inlet cone extending upstream of the fan disc, and
   wherein the alternator is situated axially inside a volume delimited by the inlet cone.

6. The turbomachine according to claim 5, wherein the alternator supplies electricity to a system for de-icing the inlet cone.

7. The turbomachine according to claim 1, further comprising means for electrically connecting the alternator with at least one fixed component of the turbomachine.

8. The turbomachine according to claim 1, further comprising means for electrically connecting the alternator with at least one moveable component of the turbomachine.

9. The turbomachine according to claim 1, wherein a rotational speed of the armature is less than a rotational speed of the inductor.

10. The turbomachine according to claim 1, wherein electrical power generated by the alternator is between 100 kW and 500 kW at a frequency between 500 Hz and 2 kHz.

* * * * *